United States Patent

[11] 3,597,548

[72] Inventors James Walter Drinnan;
John Richard Francis, both of Liverpool, England

[21] Appl. No. 808,107
[22] Filed Mar. 18, 1969
[45] Patented Aug. 3, 1971
[73] Assignee Automatic Telephone and Electric Company, Limited
[32] Priority Mar. 19, 1968
[33] Great Britain
[31] 13299/68

[54] TIME DIVISION MULTIPLEX SWITCHING SYSTEM
11 Claims, 6 Drawing Figs.

Figure 1A:
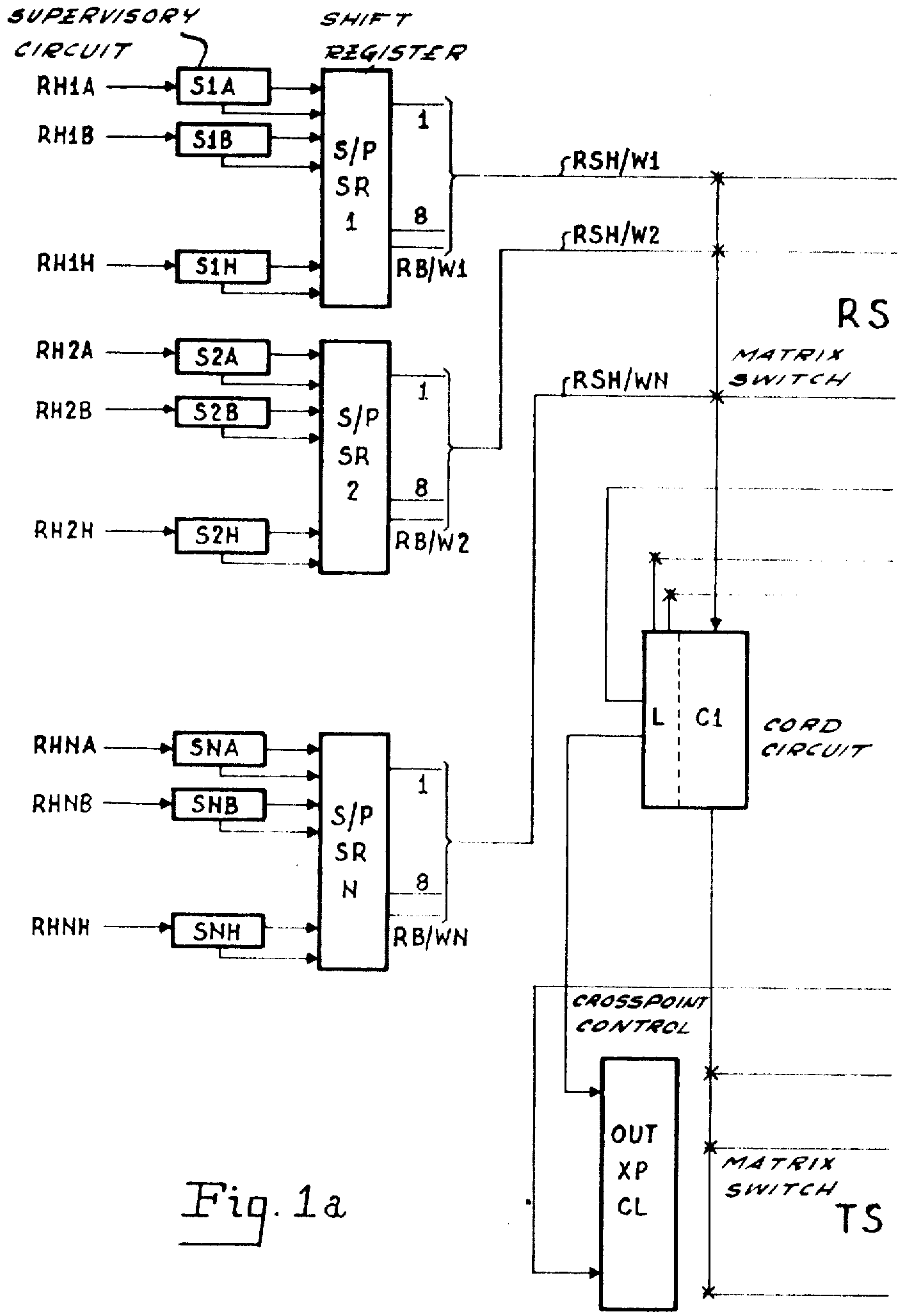

[52] U.S. Cl. .......... 179/15 AT
[51] Int. Cl. .......... H04j 3/00
[50] Field of Search .......... 179/15 AT

[56] References Cited
UNITED STATES PATENTS

| | | | |
|---|---|---|---|
| 3,041,400 | 6/1962 | Faulkner | 179/15 (AT) |
| 3,171,896 | 3/1965 | Bartlett et al. | 179/15 (AT) |
| 3,236,951 | 2/1966 | Yamamoto et al. | 179/15 (ATI) |
| 3,482,048 | 12/1969 | Takada et al. | 179/15 (SIG) |

*Primary Examiner*—Kathleen H. Claffy
*Assistant Examiner*—David L. Stewart
*Attorney*—Young and Thompson ABSTRACT: In a pulse code modulation time division multiplex telephone system, the receive junction highways, each comprising 24 channels, are organized in groups of 8 with respect to a receive superhighway. Each receive junction highway handles speech and channel condition information in serial form for 12 originating-go and 12 terminating-return channels which are interleaved. Eight shift registers are located between the 8 junction highways and a receive superhighway and the channels are processed so that the information for each is presented to the superhighway in parallel form in appropriate time slots. Thus a 96-bit frame embraces all the originating-go channels of a superhighway. Cord circuits having 96 32-bit storage locations are provided intermediate several receive and transmit superhighways to which all cord circuits have access over input and output cross-point arrays. Each storage location of a cord circuit provides storage for speech and signalling information for the control of the input and output cross-points to provide displacement compensation for the two junction channels used for the two directions of transmission. The exchange is organized on a superframe basis, eight frames constituting a superframe. Access to registers is obtained directly from the cord circuits and each of the latter is provided with scanning logic arranged to connect itself over input cross-points to successive superhighways in successive superframe periods.

INVENTORS

JAMES WALTER BRINNAN
JOHN RICHARD FRANCIS
By Young & Thompson
Attys.

INVENTORS
JAMES WALTER DRINNAN
JOHN RICHARD FRANCIS
BY Young & Thompson
ATTYS.

INVENTORS
JAMES WALTER DRINNAN
JOHN RICHARD FRANCIS
By Young & Thompson
ATTYS

INVENTORS

JAMES WALTER DRINNAN
JOHN RICHARD FRANCIS
By Young & Thompson
ATTYS

INVENTORS
JAMES WALTER DRINNAN
JOHN RICHARD FRANCIS
BY Young & Thompson
ATTYS

INVENTORS
JAMES WALTER DRINNAN
JOHN RICHARD FRANCIS
BY Young & Thompson
ATTYS.

TIME DIVISION MULTIPLEX SWITCHING SYSTEM

The present invention relates to telephone switching systems and more particularly to scanning, interrogation and registration facilities for use in telephone switching systems handling time division communication systems employing pulse code modulation techniques.

With the introduction of pulse code modulated (P.C.M.) time division multiplex telephone transmission systems for use on short distance junctions it has become necessary to provide switching equipment at switching centers capable of "interconnecting" channels on different transmission systems without demodulating the speech signals. Such telephone switching systems operate on the principle of storing the incoming speech information in discrete storage locations on a per channel basis and providing switching equipment organized to extract the stored information at the required time for feeding to one of the t.d.m. transmission systems at the output of the exchange, each storage location acting effectively as a time switching element.

The invention has particular application to a telephone switching system for interconnecting one of a plurality of incoming p.c.m. channels of $x$ bits (a number of speech bits plus one signalling bit) per channel transmitted in serial form on a plurality of time division multiplex transmission paths of $y$ channels per frame ($y$ being even) with a channel on one of a plurality of similar outgoing transmission paths, the incoming transmission paths being formed into equal groups of $x$ transmission paths per group served by an $x$ bit parallel receive superhighway carrying $x{\cdot}y$ p.c.m. channels. Each t.d.m. system consists of $y/2$ originating channels and $y/2$ terminating channels interleaved such that on odd numbered systems within a group, odd numbered channels are originating channels and even numbered channels are terminating channels while on even numbered systems within a group, odd numbered channels are terminating channels and even numbered channels are originating channels. Hence each receive superhighway consists of $x{\cdot}y/2$ originating channels interleaved with $x{\cdot}y/2$ channels. Each superhighway is served by inlets of a switching matrix whose outlets are connected to an input buffer associated with cord circuits. Each cord circuit consists of a storage device having $x{\cdot}y/2$ storage locations which are processed on a cyclic basis (i.e. sequentially starting at location 1) in synchronism with the appearance of originating channels on the superhighways and on a random basis in synchronism with the appearance of terminating channels on the superhighways under the control of time slot generators. Each storage location has five sections of storage, (i) the first for $x$ bits of p.c.m. information received by the input register over the receive superhighway when a call is in progress using that location (ii) the second for a code, indicative of the switching matrix cross-points to be operated in a cyclic time slot (iii) the third for a code indicative of the switching matrix cross-points to be operated in a random time slot (iv) the fourth for a code indicative of the address of a location in the store which is to be processed in the following random time slot and (v) the fifth for a code indicative of the point reached in the processing of an originating call using that location. Each cord circuit is provided with an output buffer whose outputs are connected to inlets of a further switching matrix. The outlets of the further switching matrix are connected to transmit superhighways each of which serves a group of $x$ outgoing transmission paths in a similar manner to that described above for the receive superhighways.

In prior art telephone systems of the above type, it is customary to provide scanning arrangements associated with the incoming junctions to interrogate the signalling bits of each system. This arrangement necessitates the provision of an access network, which must be cycled in a sufficiently short period as to ensure that a complete cycle is performed in a minimum period so that delays in setting up are minimized. For example, exchanges of this type are usually used as trunk switching centers and must, therefore, be able to detect the calling conditions and allocate a register to that calling channel in the interdigital pause. Further it is usual in such exchanges to provide a register access network through which a detected calling channel has to be connected to a selected register. Finally, when call setup is being performed it is usual to search over a number of exchange outlets to find a free channel to which the calling channel requires access. This latter operation is usually performed by means of the scanning arrangements referred to above.

From the above comments it will be appreciated that the channel scanning, register access and called channel interrogation processes require a significant amount of high speed, and therefore relatively expensive, equipment.

It is the object of the present invention to provide scanning, register and interrogation facilities in a telephone switching system of the type described which are relatively cheaper than those mentioned above without degrading the performance of these facilities.

Figure 1B:
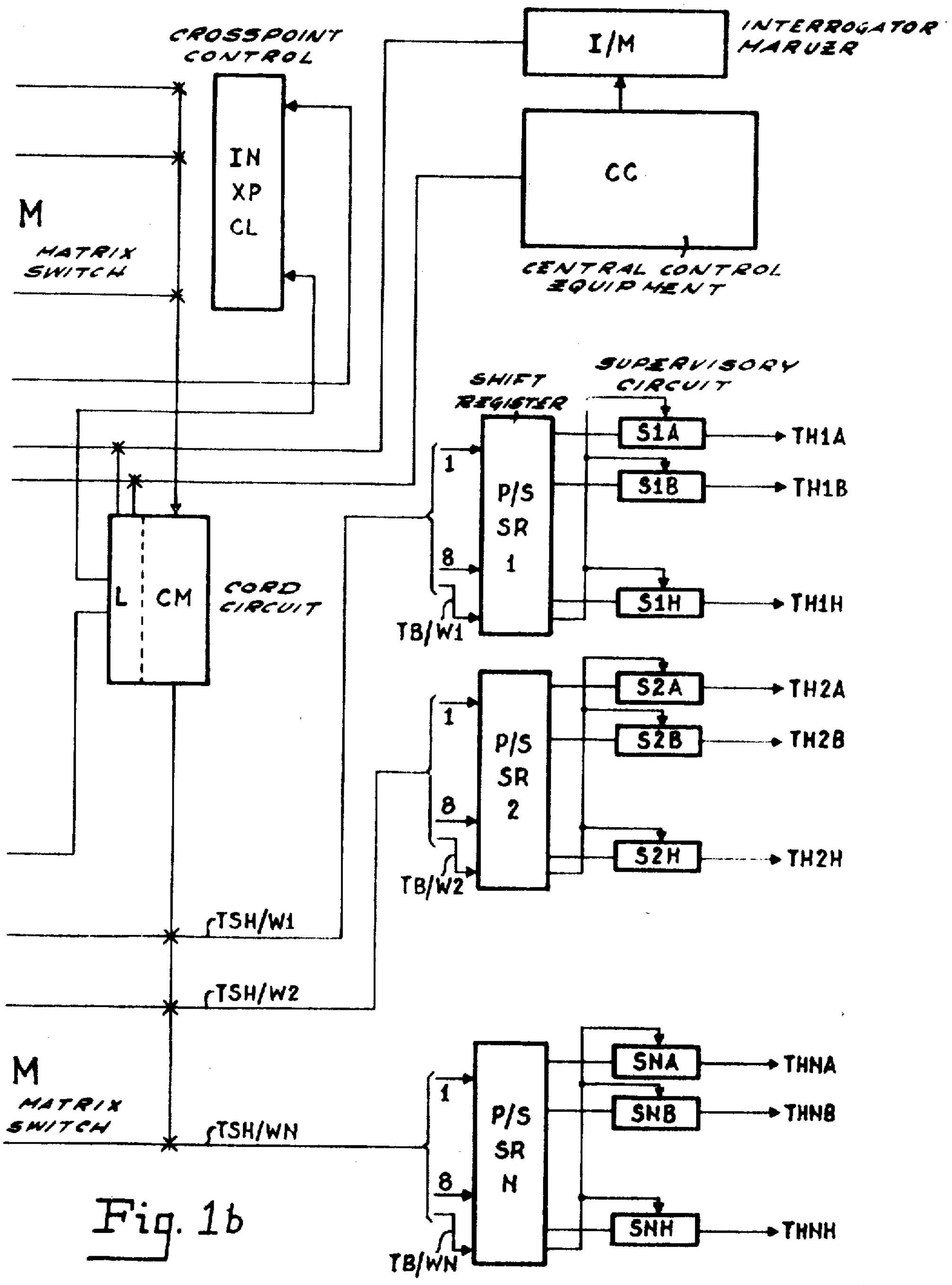
Figure 2:
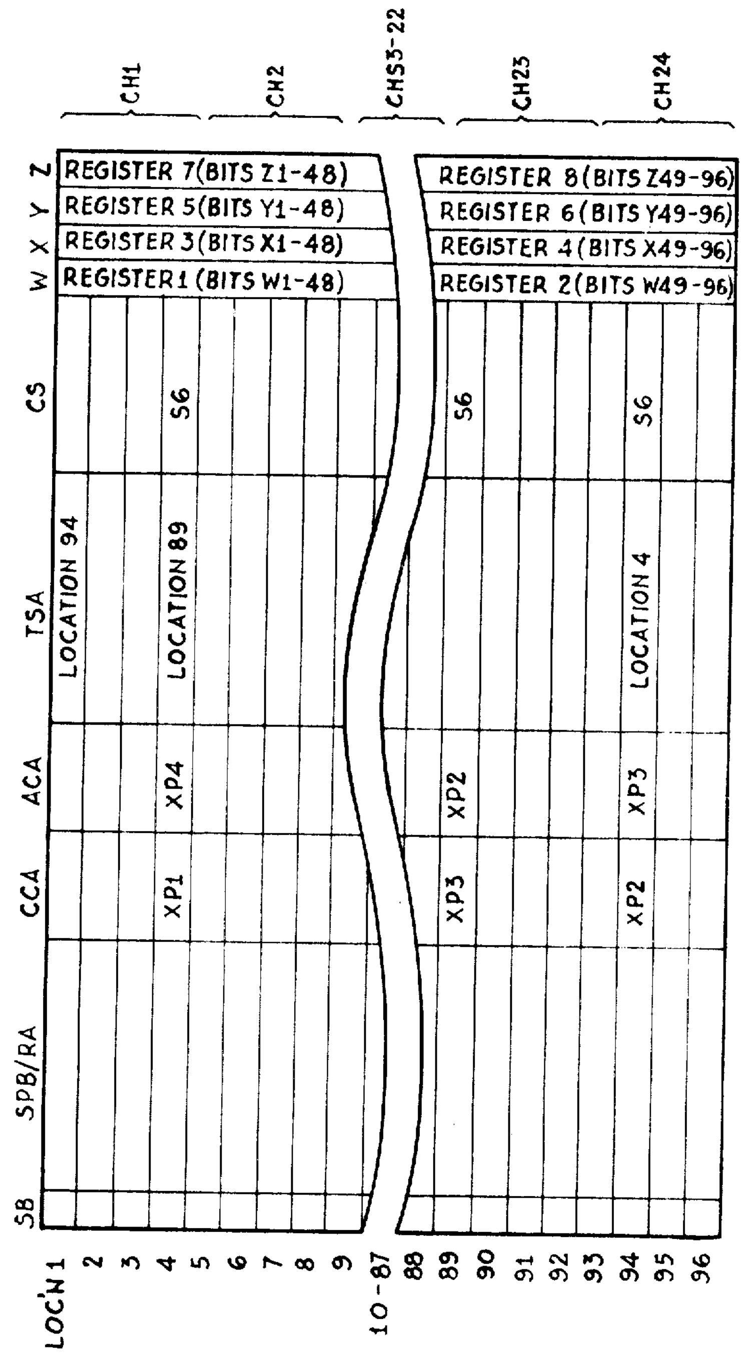
Figure 3:
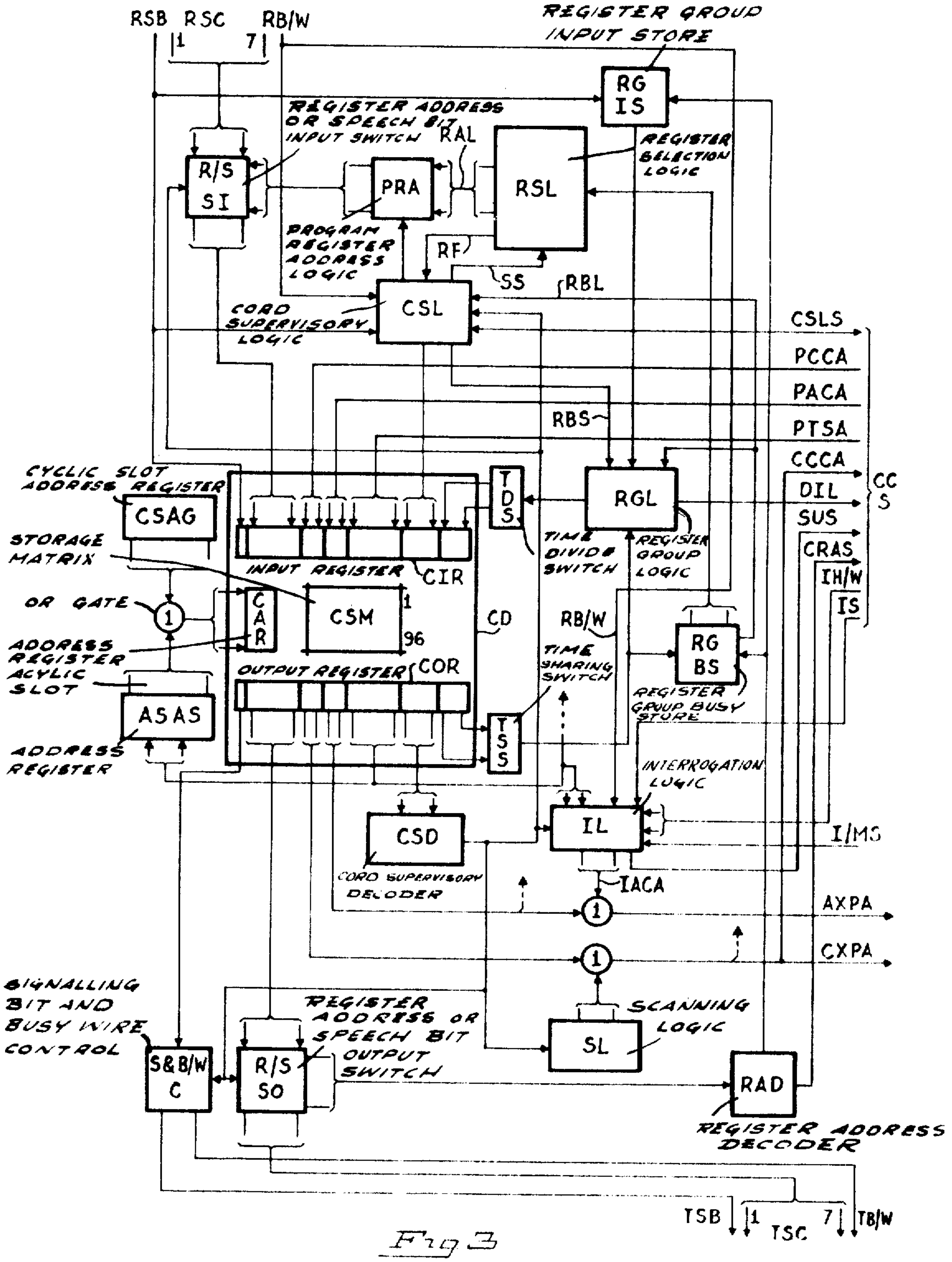
Figure 4:
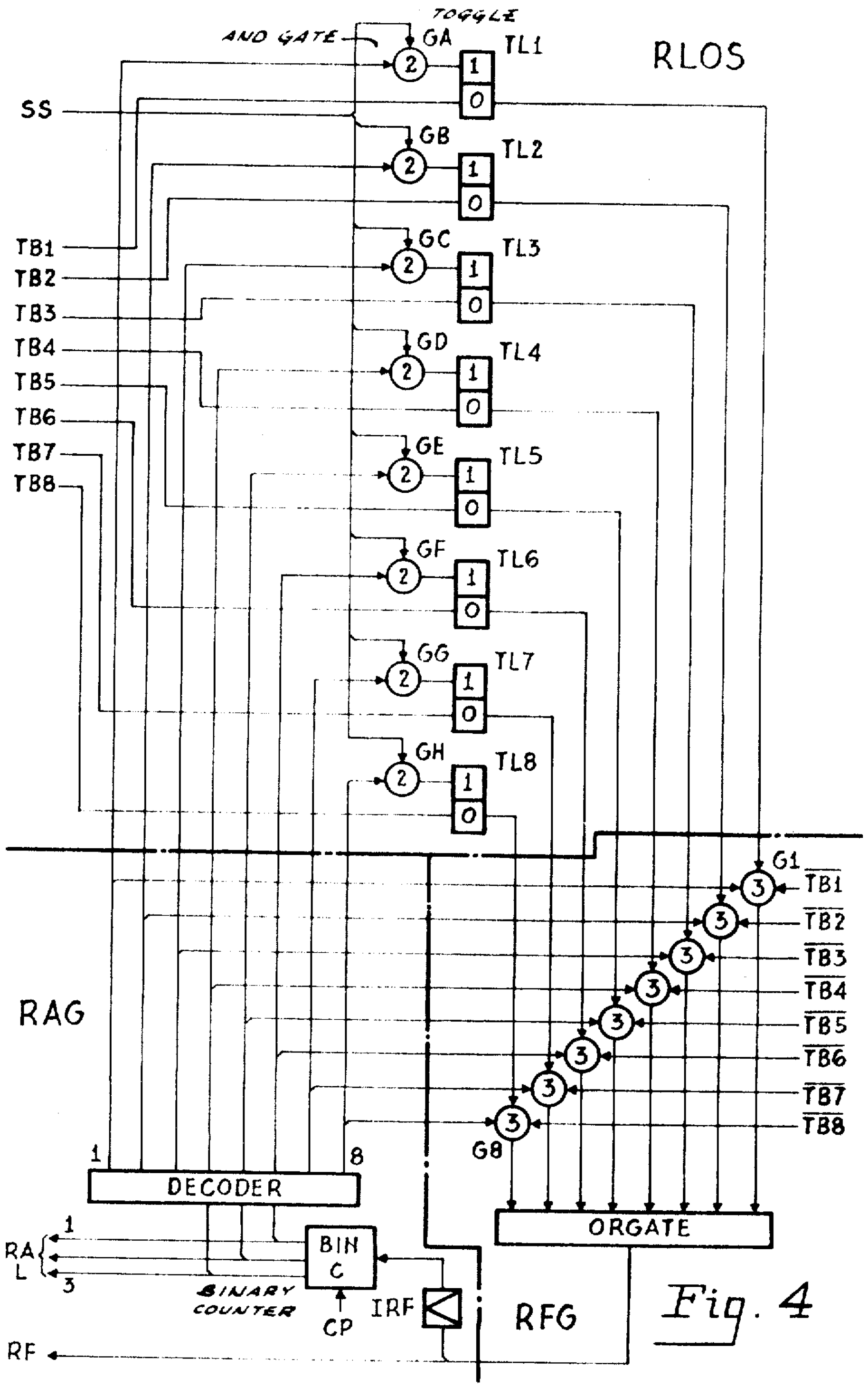
Figure 5:
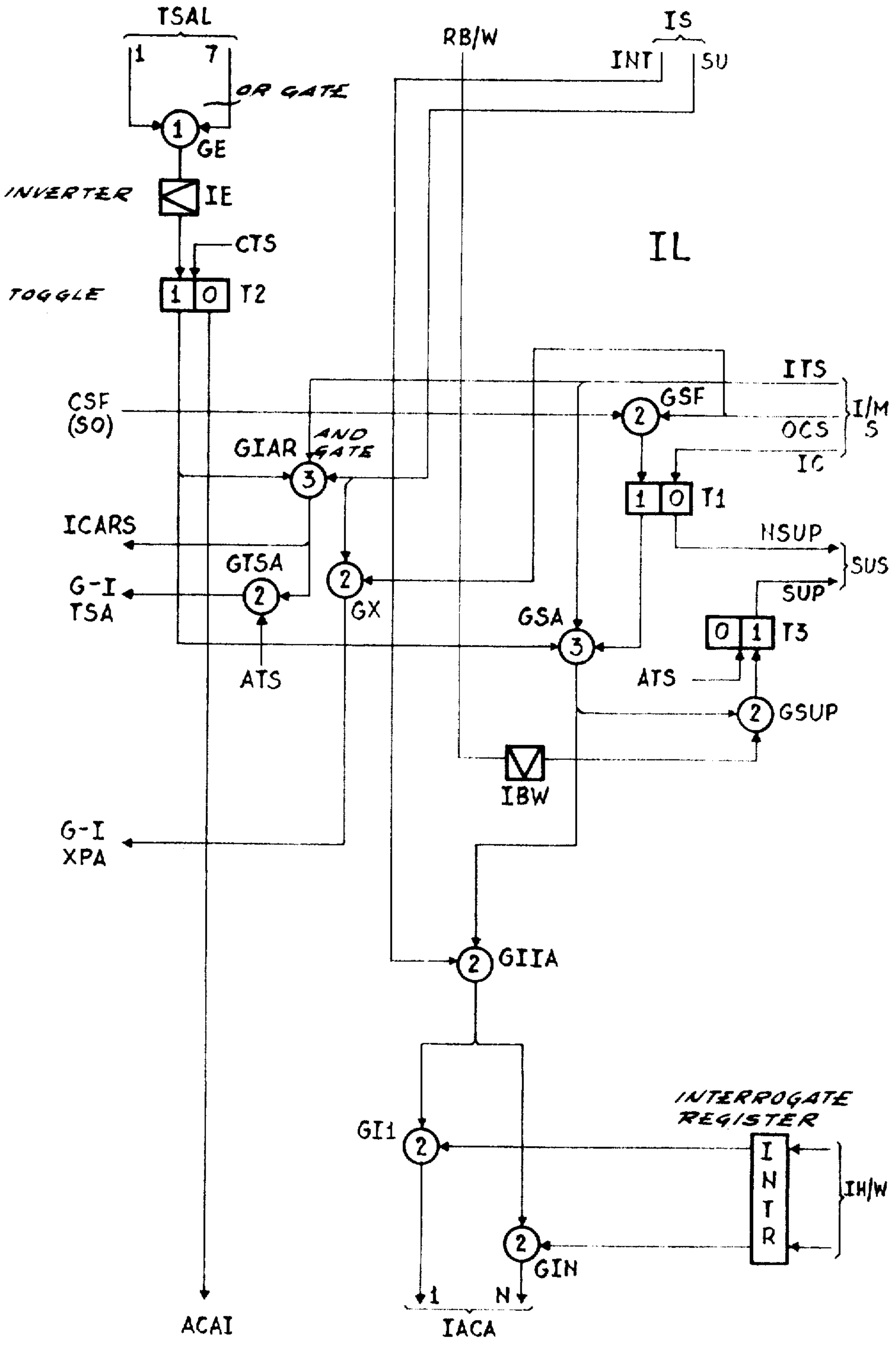

The invention will be more readily understood from the following description which should be read in conjunction with the accompanying drawings. Of the drawings:

FIG. 1 shows a skeletonized block diagram of an exchange for use with the invention, FIG. 2 shows a diagram of the storage provision in a cord circuit, FIG. 3 shows a block diagram of the equipment associated with each cord circuit, FIG. 4 shows a logic diagram of the register selection logic while FIG. 5 shows a logic diagram of the interrogation logic.

Referring firstly to FIG. 1, consisting of FIGS. 1*a* and 1*b* which should be placed side-by-side with FIG. 1*a* on the left, consideration will be given to the overall system of a typical p.c.m. switching exchange ideally suited for the incorporation of the invention. Each junction terminating at a p.c.m. switching exchange consists of a four-wire 24-channel t.d.m. transmission system using an 8-digit p.c.m. code (seven speech code bits and one signalling bit) per channel. One pair of wires conveys information to the switching exchange (the receive highway) while the other pair of wires conveys speech information from the switching exchange (the transmit highway). The systems on each pair of wires are operated on a serial basis having 192 time slots in a complete frame and are arranged to be complementary, i.e. the same numbered channels on the receive and transmit highways form the receive and transmit paths for one channel. Such similarly numbered receive and transmit paths form either originating channels or terminating channels. An originating channel is one which is used on a call which originates at the associated junction and a terminating channel is one which is used on a call which terminates at the associated junction. An originating channel on a receive highway will carry originating outgoing information, i.e. information outgoing from the calling junction to the exchange, whereas an originating channel on a transmit highway will carry originating return information, i.e. information returned from the exchange to the calling junction. Similarly, a terminating channel on a transmit highway will carry terminating outgoing information i.e. information outgoing from the exchange to the called junction, whereas a terminating channel on a receive highway will carry terminating return information, i.e. information returned from the called junction to the exchange. Further each highway is organized to carry 12 originating channels and 12 terminating channels arranged alternately. FIG. 1*a* shows the receive highways RH1A to RHNH while FIG. 1*b* shows the transmit highways TH1A to THNH. In operation receive highway RH1A and transmit highway TH1A will form the receive and transmit paths for a single junction.

Each junction is provided with a supervisory circuit, such as S1A, and this circuit handles both the receive and transmit highways of the junction. The receive highway is passed to a serial to parallel shift register, such as S/PSR1, which is common to a group of eight receive highways (RH1A to RH1H inclusive). The serial-to-parallel shift register is arranged to convert the serially received eight bits per channel into an 8-bit parallel code for presentation to the associated receive superhighway, such as RSH/W1. As each serial-to-parallel shift register serves eight receive highways and each channel on a system employs eight bits, the receive superhighways are presented with the one bit of each of the 8-bit codes for all the associated eight systems in one channel time (i.e. successively in parallel at the bit rate).

As mentioned previously each receive highway carries 12 originating channels (O) and 12 terminating channels (T) arranged alternately, hence each receive superhighway serves 96 originating channels and 96 terminating channels in the 192 bit times forming a complete frame. As the originating and terminating channels are arranged alternately on each system they also appear alternately on the receive superhighway. Taking receive superhighway RSH/W1 the channels will be arranged as shown in the following tables for the first two and last two channel times of a frame.

cord location, for use in the time slot allocated to the terminating channel for use in the connection, at the time switching address section TSA. The cord locations are processed in two interleaved cycles referred to as cyclic and acyclic cycles. As mentioned previously the receive and transmit superhighways carry originating and terminating information in alternate bit time slots hence in cyclic time slots originating information is processed while in acyclic time slots terminating information is processed.

In the cyclic time slots the cord locations are processed sequentially (i.e. 1, 2, 3 etc. to 96) while in the acyclic time slots the cord locations are processed randomly, the required location being defined each time by the time switching address of the cord location processed in the immediately prior cyclic time slot.

The following table shows the relationship between the cyclic/acyclic time slots and (1) the superhighway bit times, (2) the cord locations processed, (3) the system within a group which presents information to the cord (the actual system will be dictated by the superhighway selected by the

| | Bit time (TB) | System number | System channel | Bit time (TB) | System number | System channel | |
|---|---|---|---|---|---|---|---|
| Channel time | 1 | 1A | 1st (O) | 177 | 1A | 12th (O) | Channel time 23. |
| | 2 | 1B | 1st (T) | 178 | 1B | 12th (T) | |
| | 3 | 1C | 1st (O) | 179 | 1C | 12th (O) | |
| | 4 | 1D | 1st (T) | 180 | 1D | 12th (T) | |
| | 5 | 1E | 1st (O) | 181 | 1E | 12th (O) | |
| | 6 | 1F | 1st (T) | 182 | 1F | 12th (T) | |
| | 7 | 1G | 1st (O) | 183 | 1G | 12th (O) | |
| | 8 | 1H | 1st (T) | 184 | 1H | 12th (T) | |
| Channel time 2 | 9 | 1B | 1st (O) | 185 | 1B | 12th (O) | Channel time 24. |
| | 10 | 1A | 1st (T) | 186 | 1A | 12th (T) | |
| | 11 | 1D | 1st (O) | 187 | 1D | 12th (O) | |
| | 12 | 1C | 1st (T) | 188 | 1C | 12th (T) | |
| | 13 | 1F | 1st (O) | 189 | 1F | 12th (O) | |
| | 14 | 1E | 1st (T) | 190 | 1E | 12th (T) | |
| | 15 | 1H | 1st (O) | 191 | 1H | 12th (O) | |
| | 16 | 1G | 1st (T) | 192 | 1G | 12th (T) | |

From the above it can be seen that alternately referenced systems are organized to present originating information and terminating information alternately (e.g. system 1A is organized orig/term/orig and so on for the 24 channels while system 1B is organized term/orig/term and so on for the 24 channels). Additionally at odd numbered bit time slots, originating outgoing information is presented to the receive superhighway and at even numbered bit time slots, terminating return information is presented to the receive superhighway. These time slots are called cyclic and acyclic time slots respectively.

The receive superhighways RSH/W1 to RSH/WN are presented, over a receive switching matrix consisting of nine switches per cross-point to cord circuits C1 to CM, the number of superhighways provided being defined by the number of groups of eight junctions connected to the exchange while the number of cords provided in a switching exchange is dependent upon traffic calculations. Each cord circuit consists of 96 storage locations, as shown in FIG. 2, each location providing storage for use on one call through the exchange.

Each cord location consists of storage for (i) the signalling bit (SB), (ii) the speech bits (SPB), (iii) the cyclic cross-point address code (CCA), (iv) the acyclic cross-point address code (ACA), (v) a time switching address (TSA), (vi) a cord circuit supervisory code (CS) and (vii) one bit of each of four out of the total of eight registers provided (bits W, X, Y and Z).

When a call is set up the cord location relevant to the originating channel time slot on the receive superhighway is programmed, by the central control equipment CC, with the cross-point addresses of the relevant superhighways involved in the connection at the cyclic and acyclic address sections of that location. Additionally a further cord location which is processed in the originating channel time slot immediately prior to that allocated to the terminating channel selected for the call, is programmed, by the common control equipment CC, with the cord location address of the above-mentioned cross-point address), (4) the type of information and (5) the corresponding channel on the p.c.m. junctions, for the first two and last two channels of a frame.

| Time slot | Cord loc'n | Bit time | System | Type of inf. | Channel |
|---|---|---|---|---|---|
| CTS1 | 1 | 1 | A | Originating | 1 |
| ATS1 | TSA from 1 | 2 | B | Terminating | 1 |
| CTS2 | 2 | 3 | C | Originating | 1 |
| ATS2 | TSA from 2 | 4 | D | Terminating | 1 |
| CTS3 | 3 | 5 | E | Originating | 1 |
| ATS3 | TSA from 3 | 6 | F | Terminating | 1 |
| CTS4 | 4 | 7 | G | Originating | 1 |
| ATS4 | TSA from 4 | 8 | H | Terminating | 1 |
| CTS5 | 5 | 9 | B | Originating | 2 |
| ATS5 | TSA from 5 | 10 | A | Terminating | 2 |
| CTS6 | 6 | 11 | D | Originating | 2 |
| ATS6 | TSA from 6 | 12 | C | Terminating | 2 |
| CTS7 | 7 | 13 | F | Originating | 2 |
| ATS7 | TSA from 7 | 14 | E | Terminating | 2 |
| CTS8 | 8 | 15 | H | Originating | 2 |
| ATS8 | TSA from 8 | 16 | G | Terminating | 2 |
| CTS89 | 89 | 177 | A | Originating | 23 |
| ATS89 | TSA from 89 | 178 | B | Terminating | 23 |
| CTS90 | 90 | 179 | C | Originating | 23 |
| ATS90 | TSA from 90 | 180 | D | Terminating | 23 |
| CTS91 | 91 | 181 | E | Originating | 23 |
| ATS91 | TSA from 91 | 182 | F | Terminating | 23 |
| CTS92 | 92 | 183 | G | Originating | 23 |
| ATS92 | TSA from 92 | 184 | H | Terminating | 23 |
| CTS93 | 93 | 185 | B | Originating | 24 |
| ATS93 | TSA from 93 | 186 | A | Terminating | 24 |
| CTS94 | 94 | 187 | D | Originating | 24 |
| ATS94 | TSA from 94 | 188 | C | Terminating | 24 |
| CTS95 | 95 | 189 | F | Originating | 24 |
| ATS95 | TSA from 95 | 190 | E | Terminating | 24 |
| CTS96 | 96 | 191 | H | Originating | 24 |
| ATS96 | TSA from 96 | 192 | G | Terminating | 24 |

Reference to FIG. 2 in conjunction with the above table shows the use of the cyclic cross-point address (CCA), the acyclic cross-point address (ACA) and the time switching address (TSA) for three hypothetical calls all handled by the same cord. The three calls are (a) channel 1 on system 1G connected to channel 24 on system 4C, (b) channel 23 on system 3A connected to channel 1 on system 2H and (c) channel 24 on system 2D connected to channel 1 on system 3A. The following table shows the operations performed at the relevant cyclic and acyclic time slots:

| Time slot | X points opened | SH/W out active | Outgoing information |
|---|---|---|---|
| Acyclic TS1 (Bit time 2). | XP3 | TSH/W3 | Previously received originating go information passed from locn. 94 to channel 1 on system 3A as terminating go information. |
| Cyclic TS4 (Bit time 7). | XP1 | TSH/W1 | Previously received terminating return information passed from location 4 to channel 1 on system 1G as originating return · information. |
| Acyclic TS4 (Bit time 8). | XP2 | TSH/W2 | Previously received orig. go inf. passed from locn. 89 to chan. 1 on system 2H as term. go information. |
| Cyclic TS89 (Bit time 177). | XP3 | TSH/W3 | Previously received term. return inf. passed from locn. 89 to chan. 23 on system 3A as orig. return inf. |
| Cyclic TS94 (Bit time 187) | XP2 | TSH/W2 | Prev. received term return inf. passed from locn. 94 to chan. 24 on system 2D as orig. return inf. |
| Acyclic TS94. | XP4 | TSH/W4 | Pre. received orig. outgoing inf. passed from locn. 4 to chan. 24 on system 40 as term. outgoing inf. |

| Time slot | X points opened | SH/W in active | Incoming information |
|---|---|---|---|
| Acyclic TS1 (Bit time 2). | XP3 | RSH/W3 | Newly presented term. return information on chan. 1 of system 3A fed into speech bits of locn. 94. |
| Cyclic TS4 (Bit time 7). | XP1 | RSH/W1 | Newly presented orig. outgoing inf. on channel 1 system 1G fed into speech bits of locn. 4. |
| Acyclic TS4 (Bit time 8). | XP2 | RSH/W2 | Newly presented term. return inf. on chan. 1 system 2H fed into locn. 89. |
| Cyclic TS89 (Bit time 177). | XP3 | RSH/W3 | Newly presented orig. outgoing inf. on chan. 23 system 3A fed into locn. 89. |
| Cyclic TS94 (Bit time 187). | XP2 | RSH/W2 | Newly presented orig. outgoing inf. on chan. 24 system 2D fed into locn. 94. |
| Acyclic TS94 (Bit time 188). | XP4 | RSH/W4 | Newly presented term. return inf. on chan. 24 system 4C fed into locn. 4. |

From the above it can be seen that store location 4 provides a time switching arrangement for the interconnection of channel 1 (i.e. that 1st originating channel) on system 1G and channel 24 (i.e. the 12th terminating channel) on system 4C, location 89 provides a time switching arrangement for the interconnection of channel 23 (i.e. the 12th originating channel) on system 3A and channel 1 (i.e. the 1st terminating channel) on system 2H while location 94 provides a time switching arrangement for the interconnection of channel 24 (i.e. the 12th originating channel) on system 2D and channel 1 (i.e. the 1st terminating channel) on system 3A.

Thus it can be seen that the exchange operates for each call on the principle of (i) transmitting the originating return (previously terminating return) speech information and storing the originating outgoing speech information, in the bit time slot on a superhighway relevant to the originating channel and (ii) transmitting the terminating outgoing (previously originating outgoing) information and storing the terminating return information, in the bit time slot allocated to the terminating channel, using a single cord location. Access to the speech information in that cord location is made twice in a single frame, once at the cyclic time slot corresponding to the originating bit time and the second time at the acyclic time slot corresponding to the terminating bit time. The second access is under the control of the time switching address stored in the cord location processed in the cyclic time slot immediately preceding the above mentioned acyclic time slot.

The broad outline operation given above only relates to the performance of the exchange when a call has been established and the invention is particularly related to the equipment employed in the setting up of a call.

FIG. 3 shows in detail the equipment involved in the logic unit associated with each cord CD and this drawing will be used, in association with the other drawings, in the explanation of the invention and its features. As mentioned previously each cord, such as CD, consists of 96 storage locations in a word organized magnetic core-type of storage matrix CSM. Associated with the storage matrix CSM are three control registers (i) the input register CIR, (ii) the output register COR and (iii) the word selection or address register CAR. The store is operated on a read/write-type of operation (i.e. with destructive readout) and therefore recirculation paths are provided between certain parts of the output register COR and the input register CIR. These "re-write" paths are not shown in full and are indicated by the dotted lines associated with the time switching address (TSA) and the cyclic (CCA) and acyclic cross-point (ACA) addresses for ease of presentation of FIG. 3. The input and output registers CIR and COR respectively are divided into sections corresponding to the sectionalization of each location in the cord storage matrix CSM as shown in FIG. 2.

The leads shown at the top of FIG. 3, leads RSB, RSC1—7 and RB/W are the signalling bit, the seven speech bits and the busy wire leads of a vertical common of the receive switching matrix, RSM in FIG. 1, respectively while the leads shown at the bottom of FIG. 3, leads TSB, TSC1—7 and TB/W are corresponding leads of the associated vertical common of the transmit switching matrix, TSM in FIG. 1.

In normal operation, when a call has been set up, the cord locations are processed sequentially in cyclic time slots, as mentioned previously, under the control of the cyclic slot address generator CSAG. This generator is a clock-controlled device producing a one-out-of-96 address code output which is fed to the cord address register CAR to select the required cord location. The selection of the required cord location causes the contents of that location to be read into the cord output register COR. The required cyclic cross-point is then activated, as defined by the code in the cyclic cross-point address (CCA) section of the output register, over leads CXPA and the originating outgoing speech bits and signalling bit of the selected receive superhighway are, therefore, fed into the speech and signal bit sections of the input register while the same bits, corresponding to the previously stored terminating return information, are fed to the selected transmit highway as originating return information, the speech bits being fed (a) in by way of the "register address or speech bit input switch" R/S SI and (b) out by way of the "register address or speech bit output switch" R/S SO. At the same time the address, if any, in the time switching address (TSA) section of the output register will be read into the "acyclic slot address store" ASAS ready for use in the following acyclic time slot. This time switching address information together with the cyclic cross point address information and the acyclic cross-point address information will be written into the input register CIR, at the appropriate sections (over leads not shown in FIG. 3 but indicated by the dotted lines associated therewith), at this time, ready for reinsertion into the selected cord location while the cord supervisory code is being circulated through the cord supervisory decoder CSD and the cord supervisory logic CSL into the appropriate section of the input register CIR. At this point four bits of the registers are being processed around the loop formed by the time sharing switch TSS, the register group logic RGL and the time divide switch TDS, detailed consideration of which will be given later. The completion of the cyclic time slot period causes the writing of the contents of the input register CIR into the selected cord location.

At the start of the following acyclic time slot, the cord storage matrix CSM is addressed by the cord address register CAR with the time switching address (TSA) which was written into the acyclic slot address store ASAS in the previous cyclic time slot. When the addressed word is read out of the core storage matrix into the output register COR, the acyclic cross-point address ACA is fed from the relevant section to the cross-point controls (both INXPCL and OUTXPCL in FIG. 1) over leads AXPA. This operation allows (a) the originating outgoing information (if any) received and stored in the currently addressed location at some previous cyclic time slot, to be passed over the selected transmit superhighway as terminating outgoing information and (b) the currently presented terminating return information (if any) to be fed into the speech bits section of the input register CIR. It should be realized that in all probability the terminating return and outgoing information handled in this acyclic time slot will not be information relative to the same call as that involved in the previous cyclic time slot and therefore this terminating information is relative to another call. The originating information handled in the immediately prior cyclic time slot will be processed in a subsequent acyclic time slot following a cyclic time slot in which the time switching address (TSA) corresponding to the location storing that originating information is read out. Similar rewriting arrangements are provided in each acyclic time slot to those described for the cyclic time slot, the time switching address of the currently addressed location not being fed to the acyclic slot address store ASAS at this time.

As mentioned previously each 7-bit speech sample as associated therewith a signalling bit used for transmitting the line/loop condition of a telephone subscriber associated with the t.d.m. channel. The condition of this bit, therefore, may be used to detect a calling subscriber at the t.d.m. switching exchange.

SCANNING OPERATION operation

Each cord circuit includes a scanning logic equipment SL (FIG. 3) and this logic is organized to open a specific receive cross-point associated with a selected receive superhighway allowing the cord supervisory logic CSL to interrogate the currently presented signalling bit over lead RSB in each free cyclic time slot. Each cord in the exchange for any eight frames (a superframe) is allocated a particular receive superhighway to scan. For example in a four superhighway exchange having three cords, cord 1 scans receive superhighway 1, cord 2 scans receive superhighway 2 and cord 3 scans receive superhighway 3 for the eight frames of the phased scan cycle. The next eight frames are organized such that cord 1 scans receive superhighway 2, cord 2 scans receive superhighway 3 and cord 3 scans receive superhighway 4. The scanning in the next two super frames is similarly organized so that after four super frames (or 32 frames) the phased scan cycle returns to the first above-mentioned organization.

Each cord location includes storage for a cord supervisory code (CS) and the information stored therein is used to define the state of that cord location. The following table shows a typical example of cord supervisory code allocation.

| Code (4 bits) | Cord location state | Reference |
|---|---|---|
| 0 0 0 0 | Idle | S0 |
| 0 0 0 1 | Seize suspected | S1 |
| 0 0 1 0 | Register allocated | S2 |
| 0 0 1 1 | Register connected | S3 |
| 0 1 0 0 | Connection check | S4 |
| 0 1 0 1 | Connection made | S5 |
| 0 1 1 0 | Called sub ans | S6 |
| 0 1 1 1 | Release | S7 |
| 1 0 0 0 | N.U. tone returned | S8. |

From the above it can be seen that all cord locations not being used for call processing will be in the idle or SO state. Hence the cross-point address for each cyclic time slot is derived from the scanning logic SL, under the control of a signal produced by the cord location supervisory decoder CSD indicating that the currently processed location is not handling a call (states SO or S1) or under the control of the cyclic cross-point address section (CCA) of the currently addressed cord location, when a call is being processed or handled (status S2 to S8).

The opening of the receive cross-points by the cross-point address specified by the scanning logic SL allows the cord supervisory logic CSL to interrogate the conditions of the signalling bit, on lead RSB, and the busy wire, lead RB/W, relevant to the currently presented channel from the selected receive superhighway.

A calling condition will be indicated by a '1' state signalling bit together with a '0' state on the receive busy wire RB/W at the cyclic time of scanning interrogation. As mentioned previously each receive superhighway is scanned by a particular cord for eight frames. This period is necessary to define a genuine calling condition. The signalling bits on each highway connected to the exchange are used to signal line conditions and time synchronization codes alternately, hence a calling condition (i.e. signalling bit in the '1' state, receive busy wire in the '0' state) will be presented to the cord supervisory logic CSL in alternate frames of the eight frame superframe scanning period.

A calling condition may be detected in either of the first two signalling frames (i.e. frames 1 and 3) and its detection, by the cord supervisory logic CSL, causes the cord location supervisory code to be changed to the "seize suspected" or S1 state. When the signalling bit condition is interrogated in frame 5 of the eight frame super frame the same signalling conditions will be experienced, unless the call has been abandoned, and the cord location supervisory code is changed to the "register allocated" or S2 state if there is a free register available associated with the cord.

At this stage the address of the allocated register is written into the speech bits connection (SPB/RA) of the associated cord location by way of the program register address logic PRA and the register/speech input switch R/SSI, allowing the subsequent processing of the call to take place. The transmit busy wire TB/W is also switched to the '1' state at this stage by the decoded S2 state acting on the "signalling bit and busy wire control" S & B/WC.

From the above it can be seen that for each eight frame super frame period the scanning of calling conditions on a particular receive superhighway is performed under the control of the scanning logic SL. When a calling condition is detected the cord location supervisory code is stepped to the S2 state, the address of an allocated register is written into the speech bits of the relevant location and the corresponding transmit busy wire is changed to the '1' state for the relevant bit time slot.

REGISTER OPERATION

When the cord location supervisory code CS is stepped from the S1 (seize suspected) to the S2 (register allocated) states, by the cord supervisory logic CSL, that logic is conditioned by a register free (or available) signal RF from the register selection logic RSL shown in FIG. 4. This logic consists of a register lockout store RLOS and a register available signal generator RFG together with an address generator RAG. The lockout store RLOS consists of a number of toggles TL1 to TL8 (one for each register associated with the cord) each of which is set by way of a two input AND gate fed from the gated "seize suspected" signal SS, from the cord supervisory logic CSL in FIG. 3, and the decoded output of the register address generator RAG. The lockout store toggles TL1 to TL8 are reset from the register group busy store RGBS (in FIG. 3).

At any one period of time, the register selection logic will be producing a register available signal RF together with the address of one of the free registers. The address information is given by the binary coded output, on leads RAL, of the setting of binary counter BINC. If, for example, register 5 is the register allocated to the next call the binary counter BINC will be stopped at position five causing one state outputs on leads RAL1 and 3. The output of the binary counter BINC is also applied to a linear decoder DECODER which, in the assumed case, produces a '1' state output on its fifth lead, thus conditioning AND gate GE exclusively, ready for a '1' state signal on lead SS. At this stage toggles TB5 and TL5 will both be reset (i.e. register allocated but not taken into use), toggles TB5 being in the register group busy store RGBS (FIG. 3); hence, AND gate G5 will be open causing a '1' state output on lead RF by way of the OR gate.

When the "seize suspected" code is decoded by the cord location supervisory code decoder CSD and presented to the cord supervisory logic CSL in frame five of the eight frame superframe, the cord supervisory logic CSL in FIG. 3 produces an SS signal. This signal causes the setting of the previously conditioned register lockout toggle, toggle TL5 in the assumed case.

At the same time the cord supervisory logic changes to the "register allocated" or S2 state causing the register address on leads RAL to be passed through the program register address logic PRA in FIG. 3 and the register address/speech bit input switch R/SSI into the speech bits section of the cord input register CIR.

The setting of the associated lockout toggle, toggle TL5, causes the removal of the register available signal RF and the starting of the binary counter BINC by the inverted "not register allocated" signal by the inverter IRF. The binary counter BINC starts cycling and stops when it produces the address of a register whose toggles in the lockout store RLOS and busy store RGBS (FIG. 3) are both reset, indicating that the associated register is free. The time taken to restore the register available condition is therefore only dependent upon the speed of the counter (i.e. on the repetition rate of the clock pulses CP).

The "stepping" of the cord supervisory logic to the "register allocated" or S2 state causes a signal to be generated over lead RBS (FIG. 3) to the register group logic RGL to cause the first bit of the selected register to be changed to the '1' state at the appropriate time. The first bit of each register is used as the register busy slot.

When the register busy slot of the appropriate register is next read out of the store the corresponding register busy toggle in the register group busy store RGBS (FIG. 3) will be set causing the associated toggle (TL5) in the register lockout store RLOS (FIG. 4) to be reset. This arrangement provides a check that the selected register is seized since the output of the register group busy store RGBS is only produced when the register busy slot is marked and this output resets the lockout toggle.

If the busy toggle is not set within a predetermined period after the stepping of the cord supervisory code to the S2 state, a fault will be indicated and the cord supervisory code will return to the idle state allowing the calling condition to be detected by another cord in the next super frame period.

It was mentioned previously that the stepping of the cord location supervisory code to the S2 state caused the signalling bit and busy wire control logic S&B/WC to mark the transmit busy wire TB/W at the appropriate bit time slot period with a '1' condition. Referring to FIG. 1, it will be seen that this condition will be active in the appropriate junction supervisory circuit. This causes the receive busy wire to be marked by the same junction supervisory circuit with a '1' state condition.

When the cord location taken into use by the above-mentioned operation is next processed (i.e. at the same time as the register busy toggle is being set) the cord supervisory logic CSL (in FIG. 3) interrogates the receive busy wire RSB and then a register busy lead RBL from the register group busy store RGBS. This signal is produced, if the selected register (defined by the register address decoder RAD (FIG. 3) is busy. The signal in the register busy lead is generated by way of a two input AND gate array feeding an output OR gate, each AND gate being fed on one input with a one-out-of-eight condition defining the register and on the other input with the set side of the associated busy toggle. The register address decoder RAD is fed from the register/speech output switch R/SSO, which at this stage (state S2 from cord location supervisory code decoder CS D) is being fed with the address of the register selected to handle the call originated by the detected calling condition.

If the receive busy wire RSB is marked and the register, defined by the address in the speech bits of the currently processed cord location, is busy the cord supervisory logic will step to the "register connected" or S3 state. The cord location supervisory code will remain in this state until the calling channel has completed dialling.

The dialling information conveyed by the signalling bit, is presented to the register group logic RGL for registration by way of the register group input store RGIS (FIG. 3). This store consists of eight make/break detectors (one for each register served by the cord) fed from a two input AND gate and feeding, by way of a time controlled AND gate and a common OR gate, a toggle whose set output provides information to the register group logic. The input AND gates for the make/break detectors are fed from the signalling bit lead RSB on one input and a discrete one-out-of-eight condition, indicating a particular register from the register address decoder RAD, on the other input. The output of the make/break detector is timed in accordance with the time of processing, in the register group logic RLC, the first bit of the associated register. The make/break detectors are used to convert the signalling codes for each make and break into conditions indicative of dial pulses. These impulses are applied to the register group logic and counter for insertion in the appropriate register. Thus the register group input store provides a time adjustment function between the reception of dialled information and the time of processing the register allocated to store that information.

When the dialling is complete or when a register contains conditions which imply termination of the register connection (i.e. sufficient digits to define the outgoing route) the digits are fed out in serial form over the digit information lead DIL from the register group logic RGL (in FIG. 3), when that logic is processing the relevant register, to the common control equipment together with the address of that register.

When the contents of the relevant register are being fed to the common control equipment that register is reset, by placing a '0' in the associated busy slot, by the register group logic. Hence when the relevant register is next processed (i.e. in the following relevant one of the four frames required to process all the registers) the corresponding busy toggle in the register group busy store RGBS is reset.

When the cord location processing the call is next processed (i.e. in the frame following that in which the busy toggle was reset) it recognizes the reset state of the corresponding busy toggle as a "connected register free" condition (i.e. lead RBL will not be marked at this point) and the cord supervisory logic returns to the idle or SO state. The call remains "held" of course by the originating and terminating supervisory circuits at this time.

The registered information passed to the common control equipment CC in FIG. 1 will be applied to the translation equipment therein and ultimately information relative to the junctions, and channels thereon, applicable to the required destination code will be passed to the interrogator marker equipment I/M (FIG. 1). At the same time information relative to the superhighway time slot of the originating channel and the particular receive superhighway will be passed from the cord supervisory logic CSL to the common control. This operation will be performed by the common control interrogating leads CRAS from the register address decoder RAD for the register address corresponding to that sent to it with the dialled information. The time at which coincidence is experienced between the two register addresses indicates the time slot of the originating channel and the current cyclic cross-point address on leads CCCA will indicate the relevant receive superhighway involved.

When the above operations are complete the interrogator marker I/M (FIG. 1) will have received all the information relative to the particular call required. The interrogator marker I/M now applies signals to all the cords to allow the interrogation process to be performed.

INTERROGATION OPERATION

FIG. 5 shows a logic diagram of the equipment provided in the interrogation logic IL (FIG. 3). Two of the toggles shown in FIG. 5 toggles T2 and T3 are of the strobe pulse controlled-type being set or reset when the strobe pulse (CTS or ATS) occurs in accordance with their input conditions while toggle T1 is set and reset in accordance with its input conditions directly.

When the central control is ready to interrogate the cords, it passes the address of the superhighway serving the terminating channels, corresponding to the dialled code, to the interrogation registers (such as INTR in FIG. 5) of all the cords over the interrogation highway IH/W. At the same time, signal INT (indicating interrogate) is generated by the common control on the instruction signal leads IS. The interrogation logic IL now awaits the generation of a marking at the originating channel superhighway cyclic time slot by the interrogator/marker on the interrogator/marker signal I/MS lead OCS.

When a marking on lead OCS occurs toggle T1 is set, by way of AND gate GSF, if the cord location currently being processed is free. This condition is ascertained with reference to the cord location supervisory code decoder CSD (in FIG. 3) as signal CSF (cord supervisory free) will be produced if the cord supervisory code is in the idle or SO state. If the cord is not free at the originating channel cyclic time slot, toggle T1 will remain reset producing a "no setup possible signal" NSUP to the common control over one of the setup signal leads SUS. Toggle T1 once set remains set for the rest of the interrogation period.

The interrogator/marker now extends pulses on the "interrogate this slot" signal lead ITS at all the terminating acyclic time slots of the channels to which the connection may be made. Each time a pulse is present on lead ITS, AND gate GSA will be opened if the time switching address section TSA is free in the currently processed cord location. This latter condition is defined from the state of toggle T2.

Toggle T2 is fed on its set side with the inverted output of an OR gate GE which is constantly interrogating leads TSAL which correspond to the time switching address section TSA of the currently processed cord location. This gate GE will produce a '1' state output from inverter IE only when the time switching address section of the currently processed cord location is empty. Toggle T2, a strobe fed toggle, is therefore set for each cyclic time slot which is followed by a free acyclic time slot and remains set throughout that acyclic time slot. Hence when the "interrogate this slot" signal ITS is experienced in those cords having a free location corresponding to the originating cyclic time slot for the call, gate GSA is opened only if the time switching address section is empty in the currently processed cord location.

The opening of gate GSA causes the required superhighway address in the interrogate register INTR to be fed over leads IACA to activate the corresponding cross-points as gate GIIA will be opened by the interrogate INT instruction signal. This operation allows the state of the busy wire for the terminating channel to be interrogated by AND gate GSUP after inversion by inverter IBW. Gate GSUP will be opened if the busy wire is free (i.e. '0' state on busy wire lead RB/W) at this time, causing the setting of toggle T3 and the generation of a "setup possible" signal SUP. The "setup possible" signal will not be produced when either the busy wire is marked (i.e. channel busy) or when the time switching address section contains an address.

At the end of the interrogation operation, lead IC will be marked with a '1' causing the resetting of toggle T1 and hence the restoration to normal of the interrogation logic.

Lead SUP to the central control will carry a pulse pattern in acyclic time slots indicating the availability of the cord at channels times applicable to the call to be set up. Similar availability patterns will be produced by the other cords of the system and the common control is therefore able to select a channel and a cord to handle the call.

CALL SETUP OPERATION

When the common control selects the cord and channel to be used it takes into use the interrogation logic applicable to the selected cord alone, and a similar procedure is performed. This time, however, the instruction lead SU is marked in place of the previous marking on lead INT. When the originating channel time slot occurs, AND gate GX is opened to produce the "gate-in cross-point addresses" signal G-IXPA which allows the cyclic and acyclic cross-point address necessary for the call to be fed into the cord input register sections from the common control over leads PCCA and PACA respectively (FIG. 3).

The interrogation logic now waits for a condition on lead ITS indicating the channel time of the terminating channel. This condition is arranged to be generated in the cyclic time slot immediately preceding the selected acyclic time slot. Gate GIAR is opened at this point producing an "inhibit cord address register strobe" signal ICARS. This signal prevents the cord address register CAR in FIG. 3 from being conditioned in the acyclic time slot by the time switching address (which in this case will be zero) allowing the cyclic time slot address location to remain selected throughout the following acyclic time slot.

When the acyclic time slot occurs (timing pulse ATS) gate GTSA is opened producing a "gate-in time switching address" signal G-ITSA. This allows the time switching address on leads PTSA (FIG. 3) from the common control to be fed into the relevant section of the cord input register. This time switching address, of course, corresponds to the address of the cord location processed in the originating cyclic time slot for the call.

The parameters for the call have now been programmed into the cord and the common control therefore releases the interrogation logic allowing the call to progress.

The cord supervisory code is stepped from its idle or SO state to the call check or S4 state by signals from the common control over leads CSLS (FIG. 3) when the originating cyclic time slot operations are being performed.

From the above it can be seen that the scanning and interrogation facilities on an exchange according to the invention require very little additional equipment as the actual switching network is used as the access switches for these facilities. Further the use of registers permanently allocated to a cord facilitates easier selection and control and removes the need for a register access switch.

We claim:

1. A telephone switching system comprising in combination a plurality of four-wire junctions, a plurality of incoming time division multiplex transmission paths on two wires of each of said junctions, each of said transmission paths having $y$ channels per frame, $y$ being even, using $x$ bits per channel for pulse code modulation, said $x$ bits including a number of speech bits and one signalling bit, said incoming transmission paths being formed into equal groups of $x$ transmission paths, a plurality of $x$ bit parallel receive superhighways one for each group of transmission paths each receive superhighway carrying $x \cdot y$ channels, each of said transmission paths consisting of $y/2$ originating channels and $y/2$ terminating channels interleaved such that on odd-numbered transmission paths, odd-numbered channels are originating channels and even-numbered channels are terminating channels and on even-numbered transmission paths, even-numbered channels are originating channels and odd-numbered channels are terminating channels whereby each of said receive superhighways consists of $x \cdot y/2$ originating channels interleaved with $x.y/2$ terminating channels, a plurality of outgoing time division multiplex transmission paths on the other two of said four wires of each of said junctions, each of said transmission paths having $y$ channels per frame, $y$ being even, using $x$ bits per channel for pulse code modulation, said outgoing transmission paths being formed into equal groups of $x$ transmission paths, a plurality of $x$ bit parallel transmit superhighways one for each group of transmission paths each transmit superhighway carrying $x \cdot y$ channels, each of said outgoing transmission paths consisting of $y/2$ originating channels and $y/2$ terminating channels interleaved in the same manner as said incoming transmission paths, a first switching matrix, inlets and outlets to said first switching matrix, means connecting said receive superhighways to said inlets, a plurality of cord circuits for connection to said outlets, a second switching matrix, inlets and outlets to said second switching matrix, means connecting said inlets to said cord circuits and means connecting said outlets to said transmit superhighways, a storage device in each of said cord circuits having $x \cdot y/2$ storage locations, means for processing storage locations in cyclic time slots in synchronism with the appearance of originating channels on said superhighways, time slot generators for processing storage locations randomly in synchronism with the appearance of terminating channels on said superhighways, each of said storage locations having 1. a first section for storing $x$ bits of p.c.m. information received from a superhighway when a call is in progress using that location,
2. a second section for storing a code indicative of the cross-points of one of said first and second switching matrices to be operated in a cyclic time slot,
3. a third section for storing a code indicative of the cross-points of one of said first and second switching matrices to be operated in a random time slot,
4. a fourth section for storing a code indicative of the address of a storage location to be processed in the following random time slot, and
5. a fifth section for storing a code indicative of the stage reached in the processing of a call using that location, a scanning logic arrangement in each cord circuit, means responsive in each cyclic time slot when the code in said fifth section of the store location of a cord circuit being processed indicates that said location is not being used on a call for controlling said scanning logic arrangement to open a cross-point in said first switching matrix to connect a particular one of said receive superhighways to said cord circuit to enable interrogation of the state of the signalling bit of the pulse code modulation on the transmission path currently associated with said receive superhighway.

2. A telephone switching system as claimed in claim 1 including a counter circuit in each of said scanning logic arrangements, said counter circuit having a maximum state of count equal to the number of receive superhighways provided in the exchange and being used to define said particular receive superhighways and means for advancing said counter one step every $x$ frames.

3. A telephone switching system as claimed in claim 2 and including means in said counter circuits for selecting at any one time, on a mutually exclusive basis, one of said receive superhighways.

4. A telephone switching system comprising in combination a plurality of four-wire junctions, a plurality of incoming time division multiplex transmission paths on two wires of each of said junctions, each of said transmission paths having $y$ channels per frame, $y$ being even, using $x$ bits per channel for pulse code modulation, said $x$ bits including a number of speech bits and one signalling bit, said incoming transmission paths being formed into equal groups of $x$ transmission paths, a plurality of $x$ bit parallel receive superhighways one for each group of transmission paths each receive superhighway carrying $x \cdot y$ channels, each of said transmission paths consisting of $y/2$ originating channels and $y/2$ terminating channels interleaved such that on odd-numbered transmission paths, odd-numbered channels are originating channels and even-numbered channels are terminating channels and on even-numbered transmission paths, even-numbered channels are originating channels and odd-numbered channels are terminating channels whereby each of said receive superhighways consists of $x \cdot y/2$ originating channels interleaved with $x \cdot y/2$ terminating channels, a plurality of outgoing time division multiplex transmission paths on the other two of said four wires of each of said junctions, each of said transmission paths having $y$ channels per frame, $y$ being even, using $x$ bits per channel for pulse code modulation, said outgoing transmission paths being formed into equal groups of $x$ transmission paths, a plurality of $x$ bit parallel transmit superhighways one for each group of transmission paths each transmit superhighway carrying $x \cdot y$ channels, each of said outgoing transmission paths consisting of $y/2$ originating channels and $y/2$ terminating channels interleaved in the same manner as said incoming transmission paths, a first switching matrix, inlets and outlets to said first switching matrix, means connecting said receive superhighways to said inlets, a plurality of cord circuits for connection to said outlets, a second switching matrix, inlets and outlets to said second switching matrix, means connecting said inlets to said cord circuits and means connecting said outlets to said transmit superhighways, a storage device in each of said cord circuits having $x \cdot y/2$ storage locations, means for processing storage locations in cyclic time slots in synchronism with the appearance of originating channels on said superhighways, time slot generators for processing storage locations randomly in synchronism with the appearance of terminating channels on said superhighways, each of said storage locations having 1. a first section for storing $x$ bits of p.c.m. information received from a superhighway when a call is in progress using that location,
2. a second section for storing a code indicative of the cross-points of one of said first and second switching matrices to be operated in a cyclic time slot,
3. a third section for storing a code indicative of the cross-points of one of said first and second switching matrices to be operated in a random time slot,
4. a fourth section for storing a code indicative of the address of a storage location to be processed in the following random time slot, and
5. a fifth section for storing a code indicative of the stage reached in the processing of a call using that location, and at least one additional storage element in each storage location of a cord circuit, at least some of said additional storage elements forming successive stages in a shift register for dialled digits, the least significant bit of which is formed by the additional storage element in the first storage location.

5. A telephone switching system as claimed in claim 4 and including a plurality of additional storage elements in each storage location of a cord circuit to form a plurality of shift registers, each register having a bit capacity equal to half the number of storage locations and means for cycling two of said registers in one frame for each additional storage element.

6. A telephone switching system as claimed in claim 5 and including a register selection arrangement for generating the address of a free register and means for writing said address into the first section of the currently processed cord circuit storage location when a calling condition is first detected.

7. A telephone switching system comprising in combination a plurality of four-wire junctions, a plurality of incoming time division multiplex transmission paths on two wires of each of said junctions, each of said transmission paths having $y$ channels per frame, $y$ being even, using $x$ bits per channel for pulse code modulation, said $x$ bits including a number of speech bits and one signalling bit, said incoming transmission paths being formed into equal groups of $x$ transmission paths, a plurality of $x$ bit parallel receive superhighways one for each group of transmission paths each receive superhighway carrying $x \cdot y$ channels, each of said transmission paths consisting of $y/2$ originating channels and $y/2$ terminating channels interleaved such that on odd-numbered transmission paths, odd-numbered channels are originating channels and even-numbered channels are terminating channels and on even-numbered transmission paths, even-numbered channels are originating channels and odd-numbered channels are terminating channels whereby each of said receive superhighways consists of $x \cdot y/2$ originating channels interleaved with $x \cdot y/2$ terminating channels, a plurality of outgoing time division multiplex transmission paths on the other two of said four wires of each of said junctions, each of said transmission paths having $y$ channels per frame, $y$ being even, using $x$ bits per channel for pulse code modulation, said outgoing transmission paths being formed into equal groups of $x$ transmission paths, a plurality of $x$ bit parallel transmit superhighways one for each group of transmission paths each transmit superhighway carrying $x \cdot y$ channels, each of said outgoing transmission paths consisting of $y/2$ originating channels and $y/2$ terminating channels interleaved in the same manner as said incoming transmission paths, a first switching matrix, inlets and outlets to said first switching matrix, means connecting said receive superhighways to said inlets, a plurality of cord circuits for connection to said outlets, a second switching matrix, inlets and outlets to said second switching matrix, means connecting said inlets to said cord circuits and means connecting said outlets to said transmit superhighways, a storage device in each of said cord circuits having $x \cdot y/2$ storage locations, means for processing storage locations in cyclic time slots in synchronism with the appearance of originating channels on said superhighways, time slot generators for processing storage locations randomly in synchronism with the appearance of terminating channels on said superhighways, each of said storage locations having 1. a first section for storing $x$ bits of p.c.m. information received from a superhighway when a call is in progress using that location,
2. a second section for storing a code indicative of the cross-points of one of said first and second switching matrices to be operated in a cyclic time slot,
3. a third section for storing a code indicative of the cross-points of one of said first and second switching matrices to be operated in a random time slot,
4. a fourth section for storing a code indicative of the address of a storage location to be processed in the following random time slot, and
5. a fifth section for storing a code indicative of the stage reached in the processing of a call using that location, an interrogation logic arrangement associated with each cord circuit, an interrogation register included in said interrogation logic arrangement and responsive to the reception of the address of the superhighway serving the outgoing transmission paths corresponding to a dialled code for controlling said second switching device to operate a cross-point relative to a particular transmit superhighway to permit interrogation of the states of the transmission paths on said particular transmit superhighway.

8. A telephone switching system as claimed in claim 7 and including a control circuit in said interrogation logic arrangement activated, when the cord circuit storage location processed in the cyclic time slot corresponding to that of a channel requiring a call to be set up is free, as indicated by the state of the code in the fifth section, to cause said interrogation register to control said transmit superhighway cross-points.

9. A telephone switching system as claimed in claim 8 and including means in said control circuit for producing a discrete output signal if said cord circuit storage location is not free.

10. A telephone switching system as claimed in claim 9 and including a gating circuit in said interrogation logic arrangement, said gating circuit being activated, when said associated cord circuit is selected to handle a call, to control the writing of the cross-point addresses relevant to said call into said third and fourth sections of the currently processed storage location in the cyclic time slot applicable to the originating channel of the call.

11. A telephone switching system as claimed in claim 10 and including means responsive at the cyclic time slot prior to the random time slot applicable to the channel to be used as the terminating channel for the call, for activating said gating circuit to retain the selection of the storage location addressed in said cyclic time slot throughout the following random time slot to allow the address of the storage location processed in the cyclic time slot corresponding to the originating channel for the call to be written into the fourth section of said retained storage location.